United States Patent [19]

Sunkle et al.

[11] Patent Number: 4,468,768
[45] Date of Patent: Aug. 28, 1984

[54] SELF-TESTING COMPUTER MONITOR

[75] Inventors: Thomas H. Sunkle, Newark; John M. Cox, Pataskala, both of Ohio

[73] Assignee: Owens-Corning Fiberglas Corporation, Toledo, Ohio

[21] Appl. No.: 523,903

[22] Filed: Aug. 17, 1983

Related U.S. Application Data

[63] Continuation of Ser. No. 315,316, Oct. 26, 1981, abandoned.

[51] Int. Cl.³ .............................................. G06F 11/00
[52] U.S. Cl. ..................................... 371/16; 364/186; 371/3
[58] Field of Search ........................ 371/16, 3, 14, 62; 324/79 D; 364/184, 186

[56] References Cited

U.S. PATENT DOCUMENTS

| | | | |
|---|---|---|---|
| 3,829,842 | 8/1974 | Langdon et al. | 364/186 |
| 3,919,533 | 11/1975 | Einolf, Jr. et al. | 371/62 |
| 4,082,218 | 4/1978 | Paulinski | 371/62 |
| 4,263,647 | 4/1981 | Merrell et al. | 364/186 |
| 4,307,463 | 12/1981 | Sibley | 371/14 |
| 4,328,583 | 5/1982 | Stodola | 371/3 |

OTHER PUBLICATIONS

A.M. Usas, A Totally Self-Checking Design for the Detection of Errors in Periodic Signals, IEEE Trans. on Computers, vol. C-24, No. 5, pp. 483-489, May 1975.

*Primary Examiner*—Charles E. Atkinson
*Attorney, Agent, or Firm*—Ronald C. Hudgens; Patrick P. Pacella; Ronald E. Champion

[57] ABSTRACT

The purpose of this monitor is to detect a failure in either the computer or the monitor itself. The computer supplies an output to the monitor which toggles at a preselected first frequency. The monitor includes a mechanism for sensing if the output of the computer is toggling at a frequency outside a preselected range of frequencies. A test circuit generates periodic test pulses and a clock circuit generates timing pulses. A latching mechanism changes from a first state to a second state in response to the sensing mechanism sensing that the first frequency of the computer is outside said preselected range. A bistable mechanism is coupled to the latching mechanism and generates a second frequency only if the latch mechanism is in its first state and if the test pulses and timing pulses are present at the bistable mechanism. The failure of the monitor to generate the second frequency indicates a failure of the computer or the monitor.

19 Claims, 3 Drawing Figures

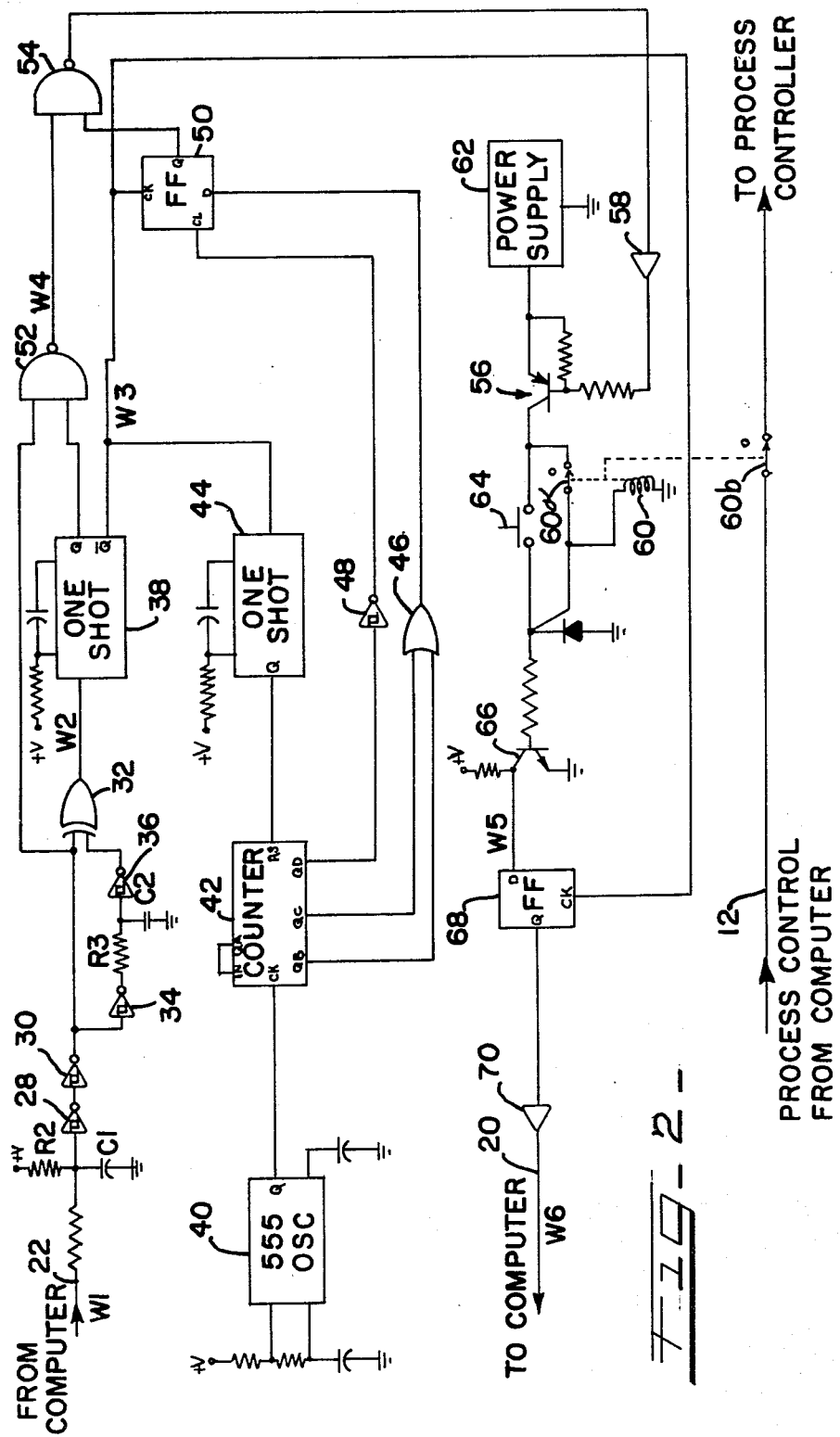

SELF-TESTING COMPUTER MONITOR

This is a continuation of application Ser. No. 315,316, filed Oct. 26, 1981, now abandoned.

BACKGROUND OF THE INVENTION

This invention relates generally to monitors for detecting a malfunction or failure of a computer and more specifically to a self-testing computer monitor. As used herein "self-testing" refers to the ability of a monitor to detect and indicate the failure of the monitor itself.

Computers are, of course, utilized in a variety of applications including the control of industrial machinery utilized to manufacture many types of products. In such applications it is especially important to detect a computer malfunction or failure since the computer controlled machinery may respond in a potentially harmful manner. The purpose of a computer monitor is to rapidly detect a hardware or system malfunction, such as a computer power supply failure or computer component failure, so that the machinery controlled by the computer can be safely stopped.

The ability of a monitor to protect the controlled equipment may be defeated by a failure of the monitor itself. In monitors of the type which utilize one output state as indicative of correct computer operation and another state as an indication of a computer failure, it is possible that a component of the monitor might fail so as to prevent the monitor from sensing or reacting to a computer failure. This type of monitor failure may only be discovered after a computer failure occurs which defeats the purpose of the monitor. The general purpose of the present invention is to provide a computer monitor capable of continually testing itself for proper operation as well as detecting a computer malfunction.

SUMMARY OF THE INVENTION

This invention is generally directed to a self-testing computer monitor which is capable of detecting a failure of the computer or of itself. The monitor of the present invention receives a signal or data from the computer which toggles at a preselected first frequency. A computer malfunction is detected if a sensing means senses that the computer output is toggling at a frequency outside a preselected range of frequencies. A test circuit means generates periodic test pulses which simulate the sensing means momentarily sensing a computer failure. A latching means which is coupled to the sensing means changes from a first state to a second state in response to the sensing means detecting a computer failure. However, the latching means is not responsive to the test pulses generated by the test circuit means. A switch connecting the process control output of the computer to a process controller is open or closed dependent upon the state of the latching means. Thus, upon the sensing of a computer failure, the computer's process control output is disconnected from the process controller thereby preventing unpredictable operation of associated equipment due to the computer failure.

A clock means produces periodic timing pulses. A bistable means generates a second frequency in response to the test pulses and timing pulses only if the latch means is in its first state, i.e. no computer failure. The generation of the second frequency by the bistable means indicates that both the computer and the monitor are functioning. The absence of the second frequency indicates a failure of the computer or monitor. The computer itself may be used to verify the presence of the second frequency.

Since the output of the monitor that is indicative of normal operation consists of a constantly toggling signal, i.e. the second frequency, a failure of a monitor component would likely cause its output to cease toggling. Of course, a sensed computer failure will also cause the monitor output to cease toggling. Thus, the monitor is continually testing itself and the computer.

BRIEF DESCRIPTION OF THE DRAWINGS

FIG. 2 is a schematic diagram of an embodiment of the present invention.

GENERAL OPERATION

A general description of the operation and circuitry of the embodiment of the present invention is provided as an aid to understanding the detailed description which follows. The input to the monitor consists of a computer output which toggles, that is, alternates between high and low states, at a preselected first frequency controlled by the computer. The monitor contains a free running astable oscillator which generates a frequency independent of that generated by the computer. A counter senses the difference between the computer frequency and the astable frequency. If this difference in frequency is outside a preselected range, a computer failure signal is produced.

If the difference in frequency is outside of this range, a computer failure is deemed to have occurred and power to a latching circuit, which includes a relay, is interrupted. One set of relay contacts is connected in series with the process control output of the computer. If power is removed from the relay for long enough for the relay to drop out, i.e. its contacts to change position, the process control path from the computer to the process controller, which interfaces the computer to the controlled machinery, will be broken causing the machinery to safely stop. The relay must be reset once a failure has been detected by a manually operated switch.

A test circuit generates periodic test pulses which cause the computer failure signal to indicate a momentary failure detection. However, the time duration or period of the test pulse is selected to be shorter than the time required for the relay to drop out. Power is momentarily removed from the coil of the relay during the test pulse.

A bistable means or flip-flop is responsive to the test pulses (as sensed by momentary power interruption to the relay) and clock pulses generated by a one shot circuit. The bistable has an output which toggles at a second frequency which is preferably equal to the first computer output frequency. The computer is preferably programmed to read the output of the bistable and respond to the absence of the secondary frequency as a failure wherein the computer can safely terminate control of associated machinery.

Since the output of the monitor toggles during non-failure conditions, the failure of a component of the monitor would likely cause the monitor's output to lock in one state which would be sensed as a failure. This and other advantages will be apparent from the detailed description which follows.

DETAILED DESCRIPTION

Figure 1:
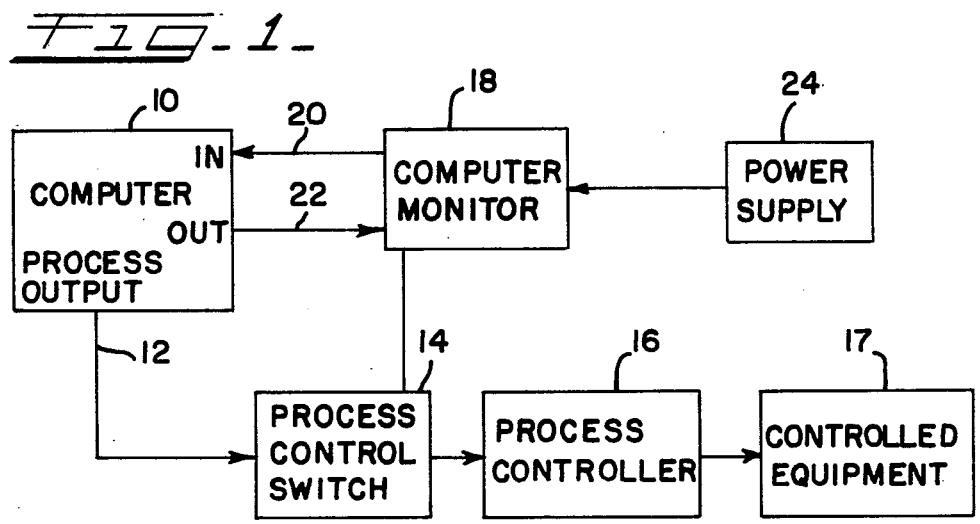
FIG. 1 is a block diagram of a computer controlled system utilizing a computer monitor according to the present invention.

In FIG. 1, computer 10 has a process control output 12 which couples control data via process control switch 14 to process controller 16 associated with equipment 17 being controlled by the computer. A computer monitor 18 receives data from an output 22 of the computer and provides an input 20 to the computer. The monitor controls whether or not power is provided to the process control switch by power supply 24. If the computer monitor detects a failure, it will cause the process control switch 14 to open thereby preventing the process controller and associated machinery from being controlled by the process output 12 of the computer.

Referring to FIG. 2, the output 22 of the computer 10 is coupled to a filter network consisting of resistors R1, R2 and capacitor C1. Inverters 28 and 30 serve as buffers and sharpen the edges of wave form W1 of output 22 which are rounded by the filter network. The output of inverter 30 is coupled to one input of an exclusive OR gate 32. The other input of gate 32 consists of the output of inverter 30 delayed in time by a delay network consisting of inverter 34, resistor R3, capacitor C2 and inverter 36. Gate 32 serves as a pulse generator triggered by either edge of output 22 (wave form W1). The output of gate 32 is represented by wave form W2 and forms the trigger input of one shot 38 which may comprise a commercially available integrated circuit such as TTL 74121. The $\overline{Q}$ output of one shot 38 consists of a series of clock or timing pulses as represented by wave form W3 which are synchronized to the output 22 of the computer. Thus, periodic clock pulses synchronized to computer output 22 are produced.

A means is provided for sensing whether or not the output 22 of the computer is toggling at a rate within a preselected range of rates, i.e. if the computer output frequency is outside of a preselected range of frequencies. The output of a free running astable oscillator 40, which may be a 555 IC operated in its free running mode, provides a clock input for binary counter 42 such as a TTL 7493. The output of one shot 44 which is triggered by the timing pulses is used to reset counter 42. The frequency of oscillator 40 is selected to be greater than the computer output frequency, such as four times greater. This will cause counter 42 to count from zero to four before being reset by one shot 44. Thus, the counter will periodically count from zero to four, be reset to zero, and start the cycle over again during normal or not failed operation.

The outputs QA, QB, QC, QD of counter 42 correspond to binary digits 1, 2, 4 and 8, respectively. The QB and QC counter outputs provide inputs to OR gate 46 and the QD output is coupled to inverter 48. The data input (D) and clear input (CL) of a flip-flop 50, such as a TTL 7474, are coupled to the output of OR gate 46 and inverter 48, respectively. The clock pulses generated by one shot 38 provide the clock input (CK) to this flip-flop. The purpose of the OR gate is to detect if the counter did not count to at least 2 before the next clock pulse. The output QD as coupled by inverter 48 is used to detect if the counter counted a number equal to or greater than 8 before the next clock pulse. If the count in the counter at the next clock pulse is not 2, 3, 4, 5, 6, or 7, a failure of either the computer or the monitor is deemed to have occurred and the output (Q) of flip-flop 50 changes state from a 1 corresponding to an operational state to 0 corresponding to a failure. Thus, as long as the output frequency of computer remains within a window of +100% to −50% of its initial preselected frequency, the computer is sensed as being operational, i.e. not having failed by the monitor. In this example, the computer output frequency is at the center of the preselected range of accepted frequencies. It will be apparent that a narrower or wider window could be selected.

The output of flip-flop 50 and the output of NAND gate 52 form the inputs of NAND gate 54. The output of gate 52 provides one test pulse as represented by wave form W4 for each cycle of computer output 22. The output of gate 54 is a 0 during normal operation and a 1 when a failure is sensed. The test pulse generated by gate 52 simulates a momentary failure detection causing the output of gate 54 to be a 1 for the duration of the test pulse.

Transistor 56 functions as a switch and is controlled by the output of gate 54 as coupled through non-inverting buffer 58. The transistor switch is ON (conducting) except when a failure is indicated by the output of gate 54 going high. Relay 60 is energized by power supply 62 via transistor switch 56 and normally open relay contacts 60a are closed during normal or not failed operation. Contacts 60a which are in series with the coil of the relay provide a latching function, that is, relay 60 cannot be reenergized after a loss of power causing contact 60a to open except by closing manually operated reset switch 64. Normally open relay contacts 60b open removing control of the process controller from the computer when relay 60 is not energized (unlatched).

Figure 3:
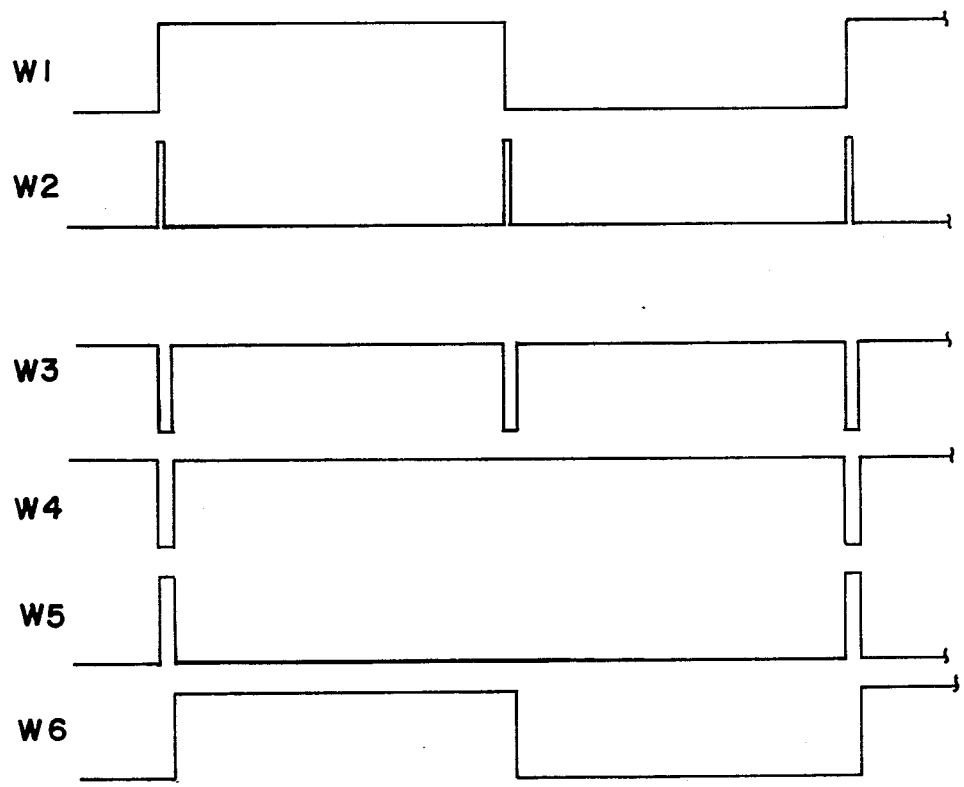
FIG. 3 illustrates wave forms W1–W6 at various circuit locations as referenced in the schematic diagram in FIG. 2.

Transistor 66 is used to sense whether or not voltage is applied to the coil of relay 60. This transistor senses the momentary removal of voltage across the relay coil in response to the test pulses. The output of transistor 66, which has an output wave W5 during normal operation, is coupled to the data input D of flip-flop 68. The clock pulses generated by one shot 38 provide the clock input (CK) to this flip-flop. The output (Q) of flip-flop 68, as coupled through non-inverting buffer 70, comprises the input 20 to the computer and has a wave form W6 as indicated in FIG. 3. The flip-flop 68 functions as a bistable for generating a toggling output during normal operation. Wave form W6 is identical in frequency and only slightly shifted in phase with respect to the computer output signal 22 as indicated by wave form W1. The presence of wave form W6, which is preferably but not necessarily sensed by the computer, indicates an operational condition of the computer and monitor. If the computer senses that wave form W6 is not present at input 20, the computer is preferably programmed to interpret this as a failure and cease process control operation until the failure is corrected.

It is important that the time duration of the test pulse generated by gate 52 be shorter than the time required for relay 60 to drop out, i.e. relay contacts 60a and 60b to open. The test pulses continually verify that gate 54 and transistor switch 56 are operational as well as checking all the components needed to generate wave form W5. It will be apparent that relay contact 60a serves as a means for preventing the test pulses from being coupled to flip-flop 68 when the relay is not latched during a failure detection. Of course, preventing either of the test pulses or clock pulses from being coupled to flip-flop 68 would cause it to stop toggling.

The preferred embodiment of the present invention requires that the computer output signal be maintained within a preselected frequency range. This provides a more secure detection system as compared with systems requiring only a minimum toggle rate since the latter would not detect a computer failure in which the output computer frequency substantially increased. The monitor self-tests almost all of its components during normal operation since the clock pulses and test pulses must be properly detected by flip-flop 68 in order to produce a toggling output.

FIG. 3 illustrates the wave forms at various points in the schematic diagram of FIG. 2. The duplication of wave form W1 by wave form W6 indicates that the monitor is operational and that the monitor has not detected a computer failure. The following example of time periods have been found to be suitable: wave form W1 could be 5 Hz (a 200 millisecond (ms) time period having a 50% duty cycle); the pulse of W2 having a time duration of approximately 1 microsecond ($\mu s$); clock pulses of W3 being 100 $\mu s$; the test pulses W4 being 100 $\mu s$; the pulses of W5 being 100 $\mu s$; and the output wave form W6 having a frequency and duty cycle substantially equal to W1. The timing or clock pulses and the test pulses are preferably synchronized to the computer output signal. The periodic test pulses are preferably generated at the rate of one for each cycle of the wave form W1. The clock pulses are preferably generated for each transition of wave form W1, that is, two clock pulses during each cycle of wave form W1 are generated.

Although an embodiment of the present invention has been described above and illustrated in the drawings, the scope of the present invention is defined by the claims appended hereto.

We claim:

1. A self-testing computer monitor for receiving a signal from a computer which toggles at a preselected first frequency, said monitor comprising:
   (a) clock means adapted to receive a first frequency signal from a computer for producing periodic timing pulses;
   (b) test circuit means adapted to receive said periodic timing pulses for generating periodic test pulses;
   (c) bistable means adapted to receive said periodic timing pulses and adapted to receive said periodic test pulses for generating a second frequency in response to said timing pulses and said test pulses;
   (d) means adapted to receive said periodic test pulses and to compare said test pulses with the output of an oscillator for sensing if said preselected first frequency of said computer is toggling at a frequency outside a predetermined range of frequencies; and
   (e) means interconnecting said means for sensing and said bistable means for preventing one of said test pulses and said timing pulses from being coupled to said bistable means in response to said sensing means sensing that said first frequency is toggling at a frequency outside said range, whereby the generation of said second frequency by said bistable means indicates that the computer and the monitor have not failed.

2. The monitor according to claim 1 wherein said clock means produces timing pulses which are synchronized to the toggling of said first frequency.

3. The monitor according to claim 2 wherein said clock means comprises a one shot circuit which is triggered by the toggling of said first frequency.

4. The monitor according to claim 3 wherein said one shot circuit generates a timing pulse during each toggle of said first frequency thereby generating two pulses during each cycle of said first frequency.

5. The monitor according to claim 1 wherein said test circuit means generates test pulses which are synchronized to the toggling of said first frequency.

6. The monitor according to claim 5 wherein said test circuit means generates one test pulse for each cycle of said first frequency.

7. The monitor according to claim 6 wherein said test circuit means generates test pulses which are synchronized to said timing pulses.

8. The monitor according to claim 1 wherein said sensing means comprises an oscillator running at a preselected third frequency, and a means for comparing the difference in frequency between said third frequency and said first frequency.

9. The monitor according to claim 8 wherein said comparing means comprises a binary counter having a clock input and reset input, one of said clock input and said reset input coupled to said oscillator to receive said third frequency and the other coupled to said clock means for receiving said timing pulses.

10. The monitor according to claim 1 wherein said sensing means has a preselected range of frequencies selected such that said first frequency is at the approximate center frequency of said range.

11. The monitor according to claim 1 wherein said bistable means comprises a flip-flop having a clock input for receiving said timing pulses.

12. The monitor according to claim 11 wherein said flip-flop has another input for receiving said test pulses.

13. The monitor according to claim 1 wherein said preventing means comprises a latching means coupled to said sensing means for changing from a first state to a second state in response to said sensing means sensing that said first frequency is outside said preselected range, said latching means coupling one of said test pulses and timing pulses to said bistable means only while in said first state, thereby preventing the generation of said second frequency when said latching means is in said second state.

14. The monitor according to claim 13 wherein said latching means includes a relay having a coil and a first set of normally open contacts connected in series with said coil wherein said relay will latch in an unenergized state upon the opening of said first set of contacts, said first and second state of said latching means corresponding to said first contacts being closed and open, respectively.

15. The monitor according to claim 14 wherein said computer includes a process control output for providing process control data to a process controller, said relay including a second set of contacts connected in series between said process control output and said process controller wherein said second set of contacts prevents said data from being coupled to said process controller when said latching means is in the second state.

16. The monitor according to claim 14 further comprising a manually operable switch connected in parallel across said first set of contacts of said relay, whereby said switch can be manually closed to permit the coil of the relay to be initially energized.

17. The monitor according to claim 13 further comprising switch means coupled to said test circuit means and said sensing means for causing said latching means to change from its first state to its second state in response to said sensing means sensing said first frequency being outside said range.

18. The monitor according to claim 14 wherein said test pulses are coupled to said coil of said relay and to said bistable means, said test circuit means producing test pulses having a time duration which is less than the time required for said relay to drop-out, whereby said first set of relay contacts do not open in response to said test pulses.

19. In a process control system including a computer having a process output for supplying control data, a process controller adapted to receive said data, a computer monitor having an input for receiving a first signal from the computer which toggles at a first frequency and having an output for coupling a second signal to said computer and a process control switch for connecting the process output of said computer to said process controller, the improvements in the computer monitor comprising:
(a) clock means adapted to receive said first frequency signal from a computer for producing periodic timing pulses;
(b) test circuit means adapted to receive said periodic timing pulses for generating periodic test pulses;
(c) means adapted to receive said periodic test pulses and to compare said test pulses with the output of an oscillator for sensing if said preselected first frequency of said computer is toggling at a frequency outside a predetermined range of frequencies;
(d) latching means, coupled to said sensing means and coupled to said test circuit means for changing from a first state to a second state in response to said sensing means sensing that said first frequency signal from the computer is outside said preselected range, said latching means not changing from its first state to its second state in response to said test pulses, said latch means controlling said process control switch such that the computer process output is coupled to said process controller only when said latching means is in its first state; and
(e) bistable means adapted to receive said periodic timing pulses and adapted to receive said periodic test pulses for generating said second signal having a second frequency in response to said test pulses and timing pulses only if said latch means is in its first state, whereby the sensing of said second frequency by the computer indicates that said computer and said monitor have not failed.

* * * * *